United States Patent
Rackovan et al.

(12) 
(10) Patent No.: US 10,131,130 B2
(45) Date of Patent: Nov. 20, 2018

(54) LABELS COMPATIBLE WITH RECYCLING

(71) Applicant: Avery Dennison Corporation, Mentor, OH (US)

(72) Inventors: Mitchell J. Rackovan, Madison, OH (US); James P. Akeley, Mill Hall, PA (US); Christopher J. Blackwell, Garrettsville, OH (US)

(73) Assignee: Avery Dennison Corporation, Glendale, CA (US)

( * ) Notice: Subject to any disclaimer, the term of this patent is extended or adjusted under 35 U.S.C. 154(b) by 0 days.

(21) Appl. No.: 14/020,197

(22) Filed: Sep. 6, 2013

(65) Prior Publication Data
US 2014/0069587 A1 Mar. 13, 2014

Related U.S. Application Data

(60) Provisional application No. 61/698,084, filed on Sep. 7, 2012.

(51) Int. Cl.
*B32B 43/00* (2006.01)
*B32B 7/12* (2006.01)
(Continued)

(52) U.S. Cl.
CPC ............. *B32B 43/006* (2013.01); *B32B 7/06* (2013.01); *B32B 7/12* (2013.01); *B32B 27/08* (2013.01);
(Continued)

(58) Field of Classification Search
CPC ... C09J 11/06; C09J 7/02; C09J 7/0217; C09J 133/08; C09J 2201/122; C09J 2201/606; C09J 2203/334; Y10T 428/28; G09F 3/10
See application file for complete search history.

(56) References Cited

U.S. PATENT DOCUMENTS 4,601,926 A * 7/1986 Jabarin ................... B29C 49/24
215/12.1
5,164,444 A 11/1992 Bernard
(Continued)

FOREIGN PATENT DOCUMENTS

CN 104024357 9/2014
EP 2031032 3/2009
(Continued)

OTHER PUBLICATIONS

International Search Report issued in corresponding IA No. PCT/US2013/058471 dated Mar. 12, 2014.
(Continued)

*Primary Examiner* — Scott R. Walshon
(74) *Attorney, Agent, or Firm* — Avery Dennison Corporation

(57) ABSTRACT

Adhesive compositions, facestocks and/or packaging labels containing same, where such compositions, facestocks and/or labels designed to facilitate the recyclability of a plastic article formed from any suitable polymer or mixture of polymers (e.g., a polyethylene terephthalate (PET), recycled polyethylene terephthalate (rPET), high density polyethylene (HDPE), polyvinyl chloride (PVC), low density polyethylene (LDPE), polypropylene (PP), polystyrene (PS), polyesters, recycled polyesters, polylacticacid (PLA), biopolymers, cellulose or other types of polymers or plastics) are described. Methods for removing an adhesive composition, facestock and/or packaging label containing same, from a plastic article that is to be recycled and/or subjected to multi-generational recycling are also provided.

31 Claims, 2 Drawing Sheets

(51) Int. Cl.
*C09J 11/06* (2006.01)
*B32B 27/08* (2006.01)
*C09J 133/08* (2006.01)
*C08F 220/10* (2006.01)
*B32B 7/06* (2006.01)
*B32B 27/32* (2006.01)
*B32B 27/36* (2006.01)
*B32B 37/12* (2006.01)
*C09J 7/20* (2018.01)
*C09J 7/38* (2018.01)
*G09F 3/10* (2006.01)

(52) U.S. Cl.
CPC .............. *B32B 27/32* (2013.01); *B32B 27/36* (2013.01); *B32B 37/12* (2013.01); *C08F 220/10* (2013.01); *C09J 7/20* (2018.01); *C09J 7/385* (2018.01); *C09J 11/06* (2013.01); *C09J 133/08* (2013.01); *B32B 2272/00* (2013.01); *B32B 2307/736* (2013.01); *B32B 2307/748* (2013.01); *B32B 2439/00* (2013.01); *B32B 2519/00* (2013.01); *C08L 2666/26* (2013.01); *C09J 2203/334* (2013.01); *C09J 2205/302* (2013.01); *C09J 2433/00* (2013.01); *G09F 3/10* (2013.01); *Y02P 20/582* (2015.11); *Y10T 156/1111* (2015.01); *Y10T 428/28* (2015.01); *Y10T 428/2852* (2015.01); *Y10T 428/3179* (2015.04); *Y10T 428/31786* (2015.04); *Y10T 428/31797* (2015.04)

(56) References Cited

U.S. PATENT DOCUMENTS

| | | |
|---|---|---|
| 5,183,459 A | 2/1993 | Bernard |
| 5,183,841 A | 2/1993 | Bernard |
| 5,189,126 A | 2/1993 | Bernard |
| 5,264,532 A | 11/1993 | Bernard |
| 5,278,227 A | 1/1994 | Bernard |
| 5,385,965 A | 1/1995 | Bernard et al. |
| 6,525,129 B1* | 2/2003 | Su ................... C09J 133/066 524/394 |
| 6,680,097 B1* | 1/2004 | Amberger ............. G09F 3/02 134/10 |
| 7,105,226 B2* | 9/2006 | Noguchi ............. B24B 7/228 428/343 |
| 8,304,073 B2* | 11/2012 | Davies ............. C09J 7/0296 156/701 |
| 2009/0218307 A1* | 9/2009 | Davies ............. C09J 7/0296 215/365 |
| 2010/0051200 A1* | 3/2010 | Mueller ............ C09J 133/08 156/703 |
| 2013/0048221 A1* | 2/2013 | Blackwell ........... C09J 7/0246 156/703 |

FOREIGN PATENT DOCUMENTS

| | | | |
|---|---|---|---|
| EP | 2284237 | 2/2011 | |
| WO | 01/46329 | 6/2001 | |
| WO | 2005/08537 | 9/2005 | |
| WO | WO 2008030202 A1 * | 3/2008 | ............ B32B 27/08 |
| WO | WO 2010117774 A1 * | 10/2010 | ............ B32B 7/12 |
| WO | 2012/13689 | 10/2012 | |
| WO | 2013/03348 | 3/2014 | |

OTHER PUBLICATIONS

Written Opinion issued in corresponding IA No. PCT/US2013/058471 dated Mar. 12, 2014.
International Preliminary Report on Patentability issued in corresponding IA No. PCT/US2013/058471 dated Mar. 19, 2015.
Critical Issues Guidance for Innovations "PET Bottle Critical Guidance Document", Association of Postconsumer Plastic Recyclers, Edition 6, last revised on Nov. 2, 2012, www.plastics.recycling.org.

* cited by examiner

LABELS COMPATIBLE WITH RECYCLING

CROSS-REFERENCE TO RELATED APPLICATION

The present application claims the benefit of U.S. Provisional Application No. 61/698,084 filed Sep. 7, 2012, which is incorporated herein by reference in its entirety.

FIELD

The present invention relates to adhesive compositions, facestocks and/or packaging labels containing same, where such compositions, facestocks and/or labels are designed to facilitate the recyclability of a plastic article formed from any suitable polymer or mixture of polymers (e.g., a polyethylene terephthalate (PET), recycled polyethylene terephthalate (rPET), high density polyethylene (HDPE), polyvinyl chloride (PVC), low density polyethylene (LDPE), polypropylene (PP), polystyrene (PS), polyesters, polylactic acid (PLA), cellulose, biopolymers, compostable materials, recycled polyesters, or other types of polymers or plastics). In another embodiment, the present invention relates to a method for removing an adhesive composition, facestock and/or packaging label containing same, from a plastic article that is to be recycled and/or subjected to multi-generational recycling.

BACKGROUND

In recent years, the use of polymer packaging articles, particularly those made of thermoplastic polymers has been increasing year after year because of their excellent resistance to breakage, lightweight properties, and transparency as compared with conventional bottles made of glass, metals, or other materials. In particular, the conversion from conventional packaging articles to polymer packaging articles has progressed most rapidly in the beverage industry where plastic, or polymer, packaging articles are used in great quantity. Although not limited thereto, one of the most popular polymer compositions for use in polymer, or plastic, packaging articles is either polyethylene terephthalate (PET) or recycled polyethylene terephthalate (rPET).

In light of the above, great interest has recently arisen in the recycling of a wide range of plastic, or polymer, packaging articles. Given this, there is currently real interest in various solutions that would, if obtained, make the recycling of plastic packaging articles for more efficient and cost effective.

For example, much attention has been paid to the recycling of bottles or thermoform containers made of thermoplastic polymers, particularly PET, and even articles made of one or more polyester polymers. In general, PET bottles are fitted with various labels, for example, stretch labels made of polyolefins; heat-shrinkable labels made of polyesters, polystyrene, polyvinyl chloride, or other polymers; and tack labels made of polypropylene or other polymers. In recycling PET bottles, such bottles are usually collected from general consumers without removal of their labels, and then brought to, for example, recycling centers. These bottles are then washed, and their labels are removed by primary crushing, at which time, however, the crushed polymer materials may still include a portion of the labels, facestocks, or adhesive used to attach same in great quantity. Therefore, the conversion of PET bottles into recycled polymer pellets may require many intervening steps such as secondary crushing, specific gravity separation of labels in a liquid, dehydration and drying, specific gravity separation of labels by air blowing, and pelletization.

SUMMARY OF THE INVENTION

The present invention relates to adhesive compositions, facestocks and/or packaging labels containing same, where such compositions, facestocks and/or labels are designed to facilitate the recyclability of a plastic article formed from any suitable polymer or mixture of polymers (e.g., a polyethylene terephthalate (PET), recycled polyethylene terephthalate (rPET), high density polyethylene (HDPE), polyvinyl chloride (PVC), poly lactic acid (PLA), cellulose, biopolymer films, low density polyethylene (LDPE), polypropylene (PP), polystyrene (PS), polyesters, recycled polyesters, or other types of polymers or plastics).

In one embodiment, a method of removing a facestock/adhesive construction from one or more articles to be recycled is provided. The method comprises a step of (a) supplying at least one article to be later recycled, the article having attached thereto at least one facestock/adhesive construction. The facestock adhesive construction includes a face layer formed from a facestock material selected from olefin polymers, polystyrene, PET, rPET, polylactic acid, biopolymers, cellulose, and combinations thereof; and an adhesive layer. The facestock wherein the facestock is able to be removed from a plastic or metal article in a manner that enables recycling of the plastic or metal article. The method also includes a step of (b) subjecting the article containing the at least one facestock/adhesive construction to at least one caustic solution until the facestock/adhesive construction releases from the article to be recycled.

In another embodiment, a facestock/adhesive construction for a plastic or metal article comprises a face layer and an adhesive layer. The face layer is formed from a facestock material selected from paper, olefin polymers, polystyrene, PET, rPET facestocks, polylactic acid, biopolymers, cellulose, and combinations thereof. The facestock is able to be removed from a plastic or metal article in a manner that enables recycling of the plastic or metal article.

In still another embodiment, a labeled plastic article comprises at least one plastic article formed from one or more of PET, rPET, a polyester polymer, a recycled polyester polymer, or any combination of two or more thereof, and the at least one plastic article contains thereon, or therein, at least one label formed from a facestock/adhesive construction. The facestock/adhesive construction includes a face layer formed from a facestock material selected from paper, olefin polymers, polystyrene, PET, rPET facestocks, polylactic acid, biopolymers, cellulose, and combinations thereof and an adhesive layer, and the facestock is able to be removed from a plastic article in a manner that enables recycling of the plastic.

DETAILED DESCRIPTION OF THE INVENTION

Figure 1:
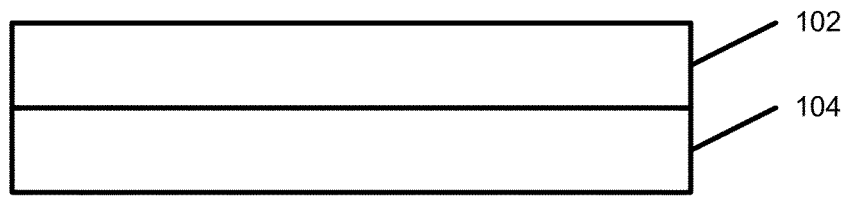
FIG. 1 is a cross-section illustration of a facestock and/or label for use on a polymer, or plastic, packaging article in accordance with one embodiment of the present invention.

The present invention relates to adhesive compositions, facestocks and/or packaging labels containing same, where such compositions, facestocks and/or labels are designed to facilitate the recyclability of a plastic article formed from any suitable polymer or mixture of polymers (e.g., a polyethylene terephthalate (PET), recycled polyethylene terephthalate (rPET), high density polyethylene (HDPE), polyvinyl chloride (PVC), low density polyethylene (LDPE), polypropylene (PP), polystyrene (PS), polylacticacid (PLA), biopolymers, cellulose, polyesters, recycled polyesters, or other types of polymers or plastics). In some instances, the polymer or mixture of polymers may be compostable. Regardless of the composition of the article, the articles may be cold filled or hot filled, and the facestocks and/or labels may be applied to the articles days after the articles molded, in line with article production, or within minutes of the articles being made. In another embodiment, the present invention relates to a method for removing an adhesive composition, facestock and/or packaging label containing same, from a plastic article that is to be recycled and/or subjected to multi-generational recycling.

Although not limited thereto, there are various types of polyethylene terephthalates (PETs) where recycling thereof is of interest. For example, such PETs include, but are not limited to, low or high intrinsic viscosity PET, amorphous PET (A-PET), un-oriented and oriented PET, and crystallized PET. Alternatively or additionally, multilayer compositions of PET including ethylene vinyl alcohol (EVOH) and/or nylon for enhancing barrier properties, or polyethylene naphthalate (PEN) as the polymer. Additionally, also of interest is the ability to utilize recycled PET (or rPET) and then subject this material to further recycling. As such, the present invention utilizes an adhesive composition that is compatible with both the underlying polymer, or plastic, compound of the polymer, or plastic, packaging article and compatible with the backmost facing layer of the facestock and/or label that is to be applied to the polymer, or plastic, packaging article. In still another embodiment, the present invention utilizes an adhesive composition that is both compatible with an underlying polyester, or recycled polyester, article and compatible with the backmost facing layer of the facestock and/or label that is to be applied to the polyester, or recycled polyester, article. Given this, the present invention will be described generically in relation to a plastic, or polymer, article.

It should be noted that when the acronym rPET is used herein that such acronym refers to packing or other materials of any type made partly or wholly from recycled PET (i.e., rPET). As would be apparent to those of skill in the art, there is a desire to be able to achieve "multi-generational recycling" of such packing or other materials that contain, in whole or in part, rPET and/or one or more recycled polyesters.

In one embodiment, the present invention is directed to an adhesive composition that when utilized in conjunction with a facestock and/or label on a polymer, or plastic, packaging article permits the efficient and cost effective recycling of the polymer, or plastic, packaging article. As would be apparent to those of skill in the art, the polymer, or plastic, packaging article can be any type of article including, but not limited to, bottles, containers, clam shell containers, flexible packaging containers, food containers, non-food item containers, etc. It may also have applicability in non-plastic containers such as those formed from one or more metals or metal alloys.

In one embodiment, any adhesive composition that can be readily dissolved, dissociated, or causes the adhesive composition to release from an underlying polymer, or plastic, surface can be utilized in conjunction with the present invention. In one embodiment, the adhesive utilized in conjunction with the present invention has sufficient adhesion at both cold and warm temperatures. As noted above, the adhesive composition utilized in conjunction with the present invention should possess compatibility with the underlying polymer, or plastic, compound of the polymer, or plastic, packaging article as well as with the backmost facing layer of the facestock and/or label that is to be applied to the polymer, or plastic, packaging article.

In one embodiment, the adhesive compound selected for use in conjunction with the present invention leaves no residue on the plastic surface that would require one or more further processing steps to remove such residue from the surface of the polymer, or plastic, packaging article prior to the recycling thereof.

In one embodiment, a suitable adhesive is selected from suitable tacky acrylic emulsion adhesive polymers that possess excellent adhesion to a wide variety of surfaces, including a wide range of polymer surfaces as well as non-polymer surfaces (e.g., stainless steel and corrugated board). Moreover, the emulsion adhesive polymers of this embodiment possess excellent cohesion and adhesion at low temperatures and, when part of a laminate stock such as pressure-sensitive adhesive label stock, provide excellent high-speed converting characteristics such as die cutting, matrix stripping and fan folding.

In one embodiment, additional suitable emulsion polymers for use as an adhesive in the present invention are disclosed in U.S. Pat. Nos. 5,164,444; 5,183,459; 5,189,126; 5,264,532; 5,278,227, the complete disclosures of which are incorporated in their entireties herein.

In another embodiment, a suitable adhesive for the present invention is a copolymer composition formed via an emulsion process from a mixture of reactants comprising at least one alkyl acrylate ester of an alcohol containing at least 4 carbon atoms in the alkyl chain, at least one polar monomer and at least one copolymerizable monomer selected from methyl acrylate, MMA, EA, VAc, and combinations of two or more thereof, wherein the reaction includes a chain transfer agent.

In still another embodiment, the adhesive composition for use in conjunction with the present invention is an acrylic emulsion polymer system comprised of a copolymer of about 15 weight percent to about 35 weight percent of vinyl acetate, about 20 weight percent to about 40 weight percent of di-2-ethylhexyl maleate, about 35 weight percent to about 60 weight percent 2-ethylhexyl acrylate and about 1 weight percent to about 3 weight percent of one or more unsaturated carboxylic acids for each 100 parts by weight of polymer, and about 3 weight percent to about 20 weight percent of acidic rosin derivative provided as tackifier and about 1 weight percent to about 10 weight percent of a rosin-based surfactant (e.g., an ethoxylated rosin based surfactant) based on 100 parts of the adhesive composition. This adhesive will be referred to as AE-3339 in the Examples contained below. Such adhesive compositions are disclosed in U.S. Pat. No. 5,385,965, the disclosure of which is hereby incorporated herein in its entirety.

In one embodiment of the present invention, the adhesive utilized herein contains a rosin-based additive that that is selected based on the rosin-based additive's ability to liquefy at the typical temperatures utilized in various caustic washing steps that are a part of various recycling processes. Suitable rosin-based additives for use in this embodiment include the various rosin-based additives detailed in U.S. Pat. No. 5,385,965.

Alternatively or additionally, the adhesive may contain a blend of anionic and ionic surfactants in the adhesive ranging between 4 weight percent and 7 weight percent based on 100 parts of adhesive composition. The blend of surfactants may be contain alkyl phenol ethoxylates, nonyl phenol ethoxylates, salts of ethenesulfonic acid, fatty alcohol ether sulfates, sulfosuccinates, and combinations thereof. Commercially available, non-limiting examples of such surfactants include POLYSTEP B-27, from Stepan Company, DISPONIL FES 77 and DISPONIL FES 32, from BASF, and HYDROPALAT 875, from BASF.

Given the above, in one embodiment the adhesive composition for use in conjunction with the present invention is selected based on the ability of a caustic wash (e.g., a caustic wash utilizing NaOH) to dissolve, dissociate, or cause the adhesive composition to release from an underlying polymer, or plastic, surface without the need for further processing steps to render the underlying polymer, or plastic, packaging article suitable for a recycling process. The adhesive can come from the group of solvent adhesives, emulsion adhesives, cold stick adhesives, radiation curable adhesives, and hot melt adhesives or any combination or layer combination of the above. It is important to remove as much, or even all, of the adhesive composition from the surface of the polymer, or plastic, packaging article as the presence of an adhesive composition contamination in a typical recycle process for PET and/or rPET, for example, can cause color change haze shift and inconsistent recycled product. Additionally, due in part to the present invention's choice of adhesive, the amount of the overall label material, the label's adhesive material, and/or the label's facestock material left on the recycled article is substantially reduced and/or eliminated. As is known to those of skill in the art, contamination of a PET and/or rPET recycle stream by label material, or facestock material can cause failure in the recycle process to occur due to a variety of reasons (e.g., excessive haze or discoloration, char, fiber/contaminates, dirt count, etc.). One method by which to evaluate labels and/or facestock material for compatibility with PET recycling is "Critical Issues Guidance for Innovations 'PET Bottle Critical Guidance Document'" last revised May 2, 2011 document, Association of Postconsumer Plastic Recyclers (www.plasticsrecycling.org), the complete disclosure of which is hereby incorporated herein in its entirety by reference.

It should be understood that the present invention is not limited to any one caustic wash process. Thus, any suitable caustic wash process can be utilized in conjunction with the present invention. Such caustic washes include, but are not limited to, NaOH, KOH, LiOH, MgOH, CaOH, or suitable mixtures of two or more thereof. In one embodiment, the concentration of the caustic material in the caustic solution is 10% or less. More specifically, the concentration of the caustic material may be 7% or less, or may be 2.5% or less. Still more specifically, the concentration of the caustic material may be 2.0%. It is envisioned that the density of the caustic wash solution will be different from the densities of both the labeled article and the label in order to facilitate floating and/or sinking of the article and label, depending on the relative densities, as well as the means by which the materials are separated from the caustic solution.

The caustic solution may also contain other agents to aid in the effectiveness of the caustic solution such as TRITON X-100. TRITON X-100 ($C_{14}H_{22}O(C_2H_4O)_n$) is a nonionic surfactant which has a hydrophilic polyethylene oxide group (on average it has 9.5 ethylene oxide units) and a hydrocarbon lipophilic or hydrophobic group. The hydrocarbon group is a 4-(1,1,3,3-tetramethylbutyl)-phenyl group. It is related to the PLURONIC range of detergents marketed by BASF. The pluronics are triblock copolymers of ethylene oxide and propylene oxide. The part formed from ethylene oxide is more hydrophilic than the part from propylene oxide. TRITON X-100 is very viscous at room temperature and is thus easiest to use after being gently warmed.

Individual reclaim/recycling facilities will use a multitude of special additives and processes (such as agitation, air allutriation, mechanical separation, chemical additives, wet grinding, friction washing, pressure washes) during the reclaim process. It is envisioned that a wash temperature range of 75-95° C., more specifically 77-93° C., and still more specifically a fixed temperature of 88° C. be employed to increase the release behavior of the facestock and/or label from the labeled article. It has been found that an agitation speed of 1500 rpm or less, or more specifically 300-1200 rpm, or even more specifically 600-1200 rpm, or still more specifically 900-1200 rpm increases the release behavior of the facestock and/or label from the labeled article. Still further, a wash time range between 1 and 15 minutes, or specifically between 5 and 15 minutes, or more specifically between 10 and 15 minutes, or even more specifically a period of 15 minutes also increases the release behavior of the facestock and/or label from the labeled article. Alternatively, the wash time may last up to 30 minutes, or may last up to an hour. However, the combination of each range of wash temperature, agitation speed, wash time, and caustic material concentration disclosed are contemplated in the facestock and/or label removal methods disclosed herein.

Turning to the Figures, FIG. 1 is a cross-section illustration of a facestock and/or label 100 for use on a polymer, or plastic, packaging article in accordance with one embodiment of the present invention. Label 100 is comprised of at least two layers, a print, or face, layer 102 and an adhesive layer 104. Adhesive layer 104 is, as discussed above, selected based on the ability of a caustic wash (e.g., a caustic wash utilizing NaOH) to dissolve, dissociate, or cause the adhesive composition to release from an underlying polymer, or plastic, surface without the need for further processing steps to render the underlying polymer, or plastic, packaging article suitable for a recycling process. It should be noted that label 100 can further include one or more layers additional non-disclosed layers or one or more additives to any layer present that either facilitate the use of a caustic wash to remove label 100 from the packaging material that is destined for recycling, or that impart a useful property or characteristic to label 100 (e.g., printability, UV-resistance, etc.). Some examples of such additional additive materials include, but are not limited to, any suitable type of surfactant (e.g., one or more nonionic surfactants, one or more ionic surfactants, one or more amphoteric surfactants, or suitable combinations thereof), polymer processing aids, UV-protectants, etc. As noted above, a suitable surfactant is TRITON X-100.

One additional factor that is considered when selecting an adhesive composition for layer 104 is the pH of the adhesive material. In one embodiment, the pH of the adhesive material should be selected such that the caustic material utilized in the wash process is able to dissolve, dissociate, or cause the adhesive composition to release from an underlying polymer, or plastic, surface without the need for further processing steps to render the underlying polymer, or plastic, packaging article suitable for a recycling process. In one embodiment, the pH of the adhesive material is between about 7 and about 14. One advantage of selecting an adhesive with a pH in the desired range is that an adhesive having a desirable pH will aid in the speed of dissociation of the adhesive. In an acidic environment, one would select an adhesive having the reverse pH range (i.e., a pH in the range of about 0 to about 7). In one embodiment, an adhesive composition is selected for layer 104 such that the adhesive layer will both release from the plastic, or metal, article to be recycled but remain attached to layer 102 of the facestock when exposed to one or more recycling processing solutions (i.e., one or more caustic solutions). In this embodiment, such an adhesive composition permits removal of the facestock of the present invention from the plastic, or metal, article to be recycled via dissociation while remaining attached to layer 102 of the facestock thereby ensuring that the adhesive composition of the present invention does not enter and/or contaminate the recycling stream.

In another embodiment, one additional factor that can be considered when selecting an adhesive composition for layer 104 is whether the adhesive composition is hydrophilic. Adhesives with compositions that yield hydrophilic properties will allow for absorption of water and the caustic solution, and aid in the speed of dissociation of the adhesive.

In another embodiment, in addition to, or instead of, one can consider the hot tack property of the adhesive composition to be utilized in conjunction with the present invention. In one embodiment, an adhesive composition with a low adhesion at an elevated temperature of more than about 50° C., or more than about 55° C., or more than about 60° C., or even more than about 65° C., is utilized. The advantage of using an adhesive composition with a low adhesion, or tack, at an elevated temperature is that this facilitates the adhesive to release when the polymer, or plastic, packaging article is subjected to the initial process to remove the packaging label prior to recycling of the underlying package.

Regarding the choice of material for the face, or print, layer 102, layer 102 is selected so that the permeability, integrity and/or chemical properties thereof are selected so that the caustic material utilized to remove facestock 102 will sufficiently permeate through and/or around layer 102 so as to reach a suitable amount of the adhesive in layer 104 in order to facilitate the dissociation, or release, of layer 104 from the surface of the polymer, or plastic, packaging article in a desired amount of time. Also of consideration in the choice of layer 102 is to make sure that the choice of material utilized in layer 102 permits enough of, or all of, the adhesive composition in layer 104 to be removed from the surface of the polymer, or plastic, packaging article.

In one embodiment, layer 102 can be formed from any suitable polymeric or paper facestock material. Such materials include, but are not limited to, olefin polymer facestocks (e.g., polyethylene facestocks, polypropylene facestocks, etc.), polystyrene facestocks, PET facestocks, or rPET facestocks. In one embodiment, where possible and/or desirable the facestocks of the present invention can be unaxially oriented, biaxially oriented, or unoriented.

In another embodiment, as would be apparent to those of skill in the art, layer 102 can be formed from two or more individual layers with the material utilized to form each layer being appropriately selected from those listed above.

For example, in one such embodiment, layer 102 can contain a topcoat layer, a print layer, and any suitable number of intermediate layers (not shown) prior to being attached to the upper, or top, surface of adhesive layer 104. In another embodiment, the bottom surface of adhesive layer 104 can have a release liner attached thereto prior to placement of facestock 100 on a desired surface of a polymer, or plastic, packaging article. Suitable release liner materials include, but are not limited to, those detailed in U.S. Pat. No. 5,084,317 the disclosure of which is incorporated herein in its entirety. In another embodiment, any suitable release liner material, or construction, that is designed for use with olefin-, PET-, or rPET-based facestocks can be utilized in conjunction with the present invention. In still another embodiment, the release line of the present invention can be any material that is suitable for use in conjunction with the one or more adhesive materials disclosed above.

Figure 2:
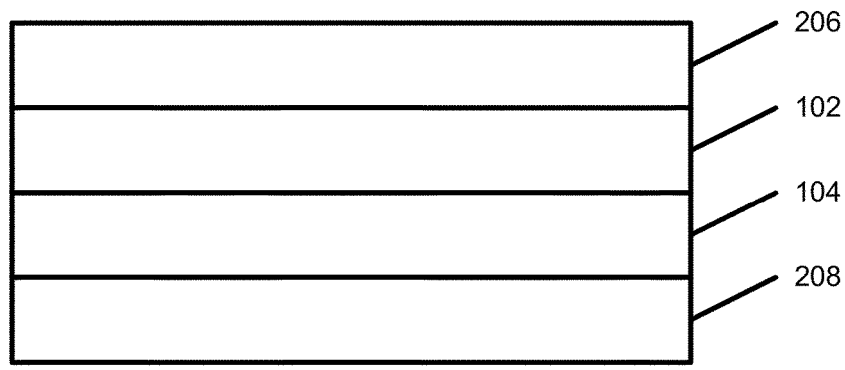
FIG. 2 is a cross-sectional illustration of a facestock and/or label for use on a polymer, or plastic, packaging article in accordance with another embodiment of the present invention.

Given this, the present invention is not limited to solely the embodiments illustrated in FIG. 1. Rather, any facestock structure, or construction, can be utilized in conjunction with the present invention so long as the layers above adhesive layer 104 permit the caustic wash to penetrate there through to facilitate the dissociation, or release, of layer 104 from the surface of the polymer, or plastic, packaging article in a desired amount of time. For example, FIG. 2 is a cross-sectional illustration of a facestock and/or label for use on a polymer, or plastic, packaging article in accordance with another embodiment of the present invention. In facestock 200 of FIG. 2, facestock 200 further contains a topcoat layer 206 and a release liner 208. As would be apparent to those of skill in the art, the thickness of any layers in the facestocks of the present invention can be varied as desired depending upon a number of factors including, but not limited to, facestock construction, the intended use of the facestock, the material utilized to produce the various layers of a facestock, etc.

In still another embodiment, the bottom surface of adhesive layer 104 can have formed therein various micro-channels to permit the inflow, via capillary action, of a caustic material when the adhesive layer is placed on a surface of a polymer, or plastic, packaging article. In still yet another embodiment, the outer surface, or a portion thereof, of the polymer, or plastic, packaging article can have various micro-channels, micro-perforations, cavitation, or micro-patterns, to permit the inflow, via capillary action, of a caustic material to the underside of adhesive layer 104 when layer 104 is placed there over. In still yet another embodiment, the surface of the polymer, or plastic, packaging article can have an appropriate lack of smoothness so as to facilitate the release of the adhesive material in layer 104 from the surface of the polymer, or plastic, packaging article. In still yet another embodiment, the polymer, or plastic, packaging article can contain therein a release agent (e.g., a silicon release agent) that can be activate by the caustic wash and thereby aid in the removal of the adhesive material in layer 104 from the surface of the polymer, or plastic, packaging article.

In one embodiment, at least one layer of facestock and/or label 100 and/or 200 are selected to have a density less than that of the substrate to which such a facestock and/or label is to be affixed. In another embodiment, at least the adhesive layer 104 and the face, or print, layer 102 of facestock and/or label 100 and/or 200 are selected to have a density less than that of the substrate to which such a facestock and/or label is to be affixed. In still another embodiment, all of the layers in facestock and/or label 100 and/or 200 are selected to have a density less than that of the substrate to which such a facestock and/or label is to be affixed.

In another embodiment, the density of at least one layer of facestock and/or label 100 and/or 200 is selected to have a density less than that of water (i.e., less than about 1.0 g/mL). In still another embodiment, the density of the adhesive layer 104 and the face, or print, layer 102 of facestock and/or label 100 and/or 200 are selected to have a density less than that of water (i.e., less than about 1.0 g/mL). In still another embodiment, all of the layers in facestock and/or label 100 and/or 200 are selected to have a density less than that of water (i.e., less than about 1.0 g/mL).

As would be apparent to those of skill in the art, one or more of the above design factors can be considered when designing a facestock, or label, in accordance with the present invention. Also, should the facestock, or label, of the present invention possess multiple layers above the adhesive layer thereof each individual layer thereof is designed taking into consideration one or more of the above factors.

In light of the above, in one embodiment the present invention makes possible the removal of a facestock, or label from the surface of a polymer, or plastic, packaging article via the use of a single caustic wash step.

Various examples within the scope of the present invention will be discussed in detail below. It should be noted that the scope of the present invention is not to be construed as limited by the nature of the examples discussed below. Rather, the scope of the present invention should be broadly construed in light of all of the various embodiments detailed herein.

The following details a comparison between a control which is an rPET bottle with no label attached thereto and two bottles each with a label attached thereto. In this example, the label utilized is formed from white biaxially oriented polypropylene (BOPP) and the adhesive is AE-3339. The Control bottle and the labeled bottles are tested using the a process that is in accordance with the process set forth in "Critical Issues Guidance for Innovations 'PET Bottle Critical Guidance Document'" last revised May 2, 2011 document, Association of Postconsumer Plastic Recyclers (APR) (www.plasticsrecycling.org).

Recycle System—the recycle system that is used in conjunction with this example of the present invention is a pilot plant wash system that is designed to process five pound batches of material. The system utilizes convection ovens to conduct and/or facilitate surface drying, a Kice Elutriator, a grinder with ⅜" screen, a Walton/Stout Desiccant Dryer, an Arburg Injection Press with a 3 MM plaque mold, and a Konica Minolta Spectrophotometer.

The procedure used to conduct the recycling test began with grinding the Control bottle (control material) and the labeled bottle (test material) separately and then processing ground material from each respective bottle separately through the pilot recycle process including a first wash (a pre-wash) and a second wash (a post wash) elutriation passes. Specifically, the test material flakes were washed according to APR standard protocol. This includes washing the material with a caustic wash as detailed below. The material was then rinsed and dried in ambient air flow. The process conditions for both the control material and test material were identical.

Following the production of test material flakes, the ground up materials were individually exposed to a caustic wash of 1% NaOH and 0.3% Triton X-100 (surfactant) at 185° F. (85° C.) for 15 minutes. The liquid to solids ratio was 4:1 by weight and an agitator was used to agitate the caustic wash at 880 rpm. These conditions represent a standard wash process used to remove dirt and label adhesive during the typical reclamation process. Thereafter, the ground up materials (or flakes) were drained of caustic wash solution and were rinsed with room temperature water for 2 minutes at 880 rpm of agitation in order to remove the caustic solution. Next flakes from each of the control material and the test material were submitted to a sink/float process. The flakes of each respective material were ambient air dried with no heat or vacuum.

The requisite amount of ground up material from each respective label bottle (Sample 1 and Sample 2) was blended at various with ground up material from the Control (non-labeled) bottle to yield three test samples having the following levels of ground up labeled test material—0 weight percent, 25 weight percent and 50 weight percent. Next, these three samples were subject to various tests as described below.

Tables 1 and 2 detail plaque analysis data for both the control material and the sample materials generated from two different labeled bottles (that is the blends of the control material with 25 weight percent and 50 weight percent test material from Sample 1 and Sample 2). Control and sample material flakes were injection molded using a 78 ton Arburg injection machine with a 3 mm plaque cavity mold. The resulting plaques were analyzed using specifications from the APR Critical Guidance Document. The test protocol requires that absolute L* values be greater than 82, absolute haze value less than 9.5% and the calculated difference or Delta value (Δb*) of the b* be less than 1.5 units when compared to the control.

TABLE 1

| Sample | L* Values | a* Values | b* Values | L* Average | a* Average | b* Average | Haze | Haze Average |
|---|---|---|---|---|---|---|---|---|
| Control | 88.55 | −0.9 | 5.12 | 88.49 | −1.05 | 5.72 | 7.07 | 6.69 |
|  | 88.43 | −1.16 | 6.21 |  |  |  | 6.58 |  |
|  | 88.54 | −1.02 | 5.52 |  |  |  | 6.56 |  |
|  | 88.39 | −1.17 | 6.32 |  |  |  | 6.62 |  |
|  | 88.54 | −0.99 | 5.41 |  |  |  | 6.64 |  |
| Control with 25 | 88.32 | −0.89 | 5.31 | 88.22 | −0.90 | 5.48 | 7.40 | 7.68 |
| weight percent | 88.13 | −0.87 | 5.34 |  |  |  | 7.86 |  |
| Sample 1 | 88.14 | −0.87 | 5.31 |  |  |  | 7.89 |  |
| material | 88.17 | −0.96 | 5.96 |  |  |  | 7.48 |  |
|  | 88.36 | −0.89 | 5.48 |  |  |  | 7.79 |  |
| Control with 50 | 88.35 | −0.75 | 4.75 | 88.33 | −0.74 | 4.76 | 8.45 | 8.58 |
| weight percent | 88.39 | −0.74 | 4.72 |  |  |  | 8.30 |  |
| Sample 1 | 88.36 | −0.74 | 4.75 |  |  |  | 8.35 |  |
| material | 88.25 | −0.74 | 4.80 |  |  |  | 8.92 |  |
|  | 88.31 | −0.75 | 4.80 |  |  |  | 8.88 |  |

TABLE 2

| Sample | L* Values | a* Values | b* Values | L* Average | a* Average | b* Average | Haze | Haze Average |
|---|---|---|---|---|---|---|---|---|
| Control | 88.55 | −0.9 | 5.12 | 88.49 | −1.05 | 5.72 | 7.07 | 6.69 |
|  | 88.43 | −1.16 | 6.21 |  |  |  | 6.58 |  |
|  | 88.54 | −1.02 | 5.52 |  |  |  | 6.56 |  |
|  | 88.39 | −1.17 | 6.32 |  |  |  | 6.62 |  |
|  | 88.54 | −0.99 | 5.41 |  |  |  | 6.64 |  |
| Control with 25 weight percent Sample 2 material | 88.30 | −0.94 | 5.51 | 88.18 | −1.06 | 6.05 | 8.06 | 8.33 |
|  | 88.06 | −1.20 | 6.90 |  |  |  | 8.72 |  |
|  | 88.04 | −1.25 | 6.79 |  |  |  | 8.60 |  |
|  | 88.21 | −0.99 | 5.67 |  |  |  | 8.19 |  |
|  | 88.29 | −0.91 | 5.38 |  |  |  | 8.10 |  |
| Control with 50 weight percent Sample 2 material | 88.22 | −0.76 | 5.03 | 88.28 | −0.76 | 4.89 | 8.45 | 8.15 |
|  | 88.32 | −0.75 | 4.76 |  |  |  | 8.05 |  |
|  | 88.30 | −0.72 | 4.79 |  |  |  | 8.17 |  |
|  | 88.27 | −0.79 | 4.99 |  |  |  | 8.11 |  |
|  | 88.30 | −0.77 | 4.90 |  |  |  | 7.96 |  |

TABLE 3

| Material | Weight (lbs) | 1st Elutriation | Weight (lbs) | 2nd Elutriation | Floatables |
|---|---|---|---|---|---|
| Control | 39.99 | 1.31% | 38.4 | 0.52% | 0.00% |
| Sample 1 | 21.20 | 1.14% | 8.80 | 0.26% | 0.65% |
| Sample 2 | 10.10 | 0.58% | 8.80 | 0.17% | 0.87% |

As shown in Table 3, the removal of the test labels from the flake material was illustrated through two elutriations and the sink/float process in the table above. The first elutriation for Label Sample 1 was greater than that of Label Sample 2 and as such there appears to be more fine PET particles present in the Label Sample 1's elutriated materials. The labels all removed similarly in the second elutriation and sink/float steps. The labels removed in large amounts during the sink/float step and a visual inspection of the flakes shows little to no remaining labels in the materials. The molded plaques show what could be expected from a product made of recycled material. Using the APR CGD as a base for plaque coloration based off the control, both variables have acceptable color values as well as acceptable haze values. Accordingly, nearly all of the label flakes were removed efficiently through the sink/float and elutriation processing.

The following table, Table 4, details a comparison between a control (an rPET bottle with no label attached thereto) and a bottle with a label attached thereto. In this example, the label utilized is formed from white biaxially oriented polypropylene (BOPP) and the adhesive is AE-3339. The label has no printing on it and is about 8 square inches in size with a label thickness of 0.003 inches. The Control bottle and the labeled bottle are tested using the a process that is in accordance with the process set forth in "Critical Issues Guidance for Innovations 'PET Bottle Critical Guidance Document'" last revised May 2, 2011 document, Association of Postconsumer Plastic Recyclers (APR) (www.plasticsrecycling.org).

Figure 3:
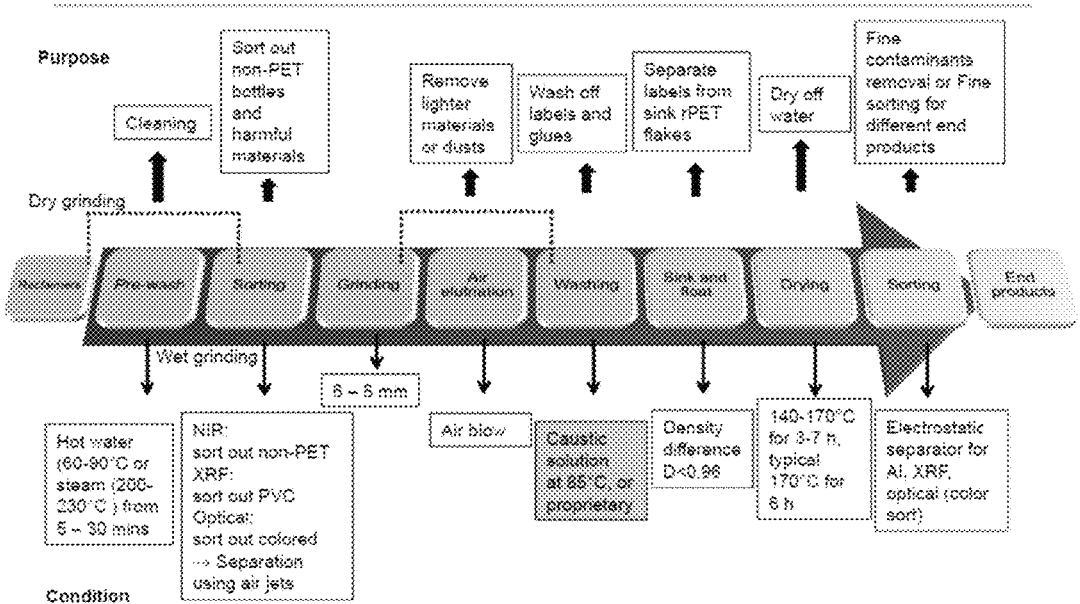
FIG. 3 is an illustration of the various steps in one example of a plastics recycling process.

FIG. 3 is an illustration of one example of a plastics recycling process. As would be apparent to those of skill in the art, the present invention is not limited to solely the recycling process detailed in annotated FIG. 3.

TABLE 4

| Step | Property | Control Result | Adhesive/ Label Result | Guideline | Control Pass/Fail | Adhesive/ Label Pass/Fail |
|---|---|---|---|---|---|---|
| Ground Thermoform Data | Weight of Flake Sample Analyzed, grams |  | 25.0 |  |  |  |
|  | Weight label/flake present, grams |  | 2.8 |  |  |  |
|  | Weight % Label/Flake remaining |  | 11.2% |  |  |  |
|  | ppm of Label/Flake remaining |  | 11200 |  |  |  |
| 1st Elutriation Results | Weight Flake Elutriated, pounds | 13 | 12.8 |  |  |  |
|  | 1st Elutriation Weight Loss, grams | 101 | 95.4 |  |  |  |
|  | 1st Elutriation Weight Loss, % | 1.7% | 1.6% | Less than 2% loss, set up on Control |  |  |
|  | Weight of Flake Sample Analyzed, grams |  | 25.0 |  |  |  |
| 1st Elutriation Results | Weight label/flake present, grams |  | 2.4 |  |  |  |
|  | Weight % Label/Flake remaining |  | 9.6% |  |  |  |
|  | ppm of Label/Flake remaining |  | 96000 |  |  |  |
| Color Thermoform | L* transmittance, film pre-wash | 95.9 | 95.7 |  |  |  |
|  | a* transmittance, film pre-wash | 0.01 | 0.02 |  |  |  |
|  | b* transmittance, film pre-wash | 0.4 | 0.49 |  |  |  |

TABLE 4-continued

| Step | Property | Control Result | Adhesive/Label Result | Guideline | Control Pass/Fail | Adhesive/Label Pass/Fail |
|---|---|---|---|---|---|---|
| Wash Results Flake | L* post-wash | 77.2 | 76.2 | | | |
| | a* post-wash | −0.53 | −0.11 | | | |
| | b* post-wash | 0.32 | 0.58 | Less than 3 | Pass | Pass |
| | Weight Flake Washed, pounds | 2 | 12.4 | | | |
| Wash Results Flake | Weight of Flake Sample Analyzed, grams | | 500.0 | | | |
| | Weight label/flake present, grams | | 0.00 | | | |
| | Weight % Label/Flake remaining | | 0.00% | | | |
| | ppm of Label/Flake remaining | | 0 | | | |
| Wash Water Color | L* | 0.0 | 0.0 | | | |
| | ΔL* | | 0.0 | | | |
| | a* | 0.00 | 0.00 | | | |
| | Δa* | | 0.00 | | | |
| | b* | 0.00 | 0.00 | | | |
| | Δb* | | 0.00 | | | |
| | ΔE* ab | | 0.0 | Less than 1 | | Not Applicable |
| Wash Observations | Note if label floated, dissolved etc. | | Floated | | | |
| 2nd Elutriation Results | Weight Flake Elutriated, pounds | 12.0 | 10.5 | | | |
| | 2nd Elutriation Weight Loss, grams | 1.0 | 96.7 | | | |
| | 2nd Elutriation Weight Loss, % | 0.0% | 2% | Less than 2% loss, set up on Control | | |
| | Weight of Flake Sample Analyzed, grams | | 500.0 | | | |
| | Weight label/flake present, grams | | 0.00 | | | |
| | Weight % Label/Flake remaining | | 0.00% | | | |
| | ppm of Label/Flake remaining | | 0 | | | |
| Plaque Molding Data | 3 mm Plaque - Drying Temperature (° C.) | 160 | 160 | | | |
| Plaque Molding Data | 3 mm Plaque - Sample Moisture (ppm) | 4 | 5 | | | |
| | Color - L*, transmission, 3 mm plaques | 89.6 | 88.2 | Greater than 82 | Pass | Pass |
| | Color - ΔL* from Control | | −1.3 | No guideline specified | | |
| | Color - a*, transmission, 3 mm plaques | −0.31 | −0.68 | No guideline specified | | |
| | Color - Δa* from Control | | −0.37 | No guideline specified | | |
| | Color - b*, transmission, 3 mm plaques | 4.67 | 6.67 | | | |
| | Color - Δb* from Control | | 2.00 | Less than 3 | | Pass |
| | Color - Haze (%) | 13.9% | 16.9% | | | |
| Plaque Molding Data | Color - ΔHaze* from Control | | 3.0 | Less than 10% | | Pass |
| | Specks - Number failed plaques (50 plaque min.) | 4 | 6 | | | |
| | Specks - ΔFailed Plaques | | 2.0 | Pass/Fail based on 5% Significance, using an unpaired t-Test comparing Test plaques to Control plaques - No more than Control | | Pass |
| Observations | Fluorescence | None | None | | Pass | Pass |

Experimental Procedure:

In evaluating the removability of facestock/adhesive constructions, PET and PS containers were cut into suitably sized squares for observation using 2×2 inch dies, with representative specimens taken from the flat section on the lid of a suitable container. Each specimen was submerged in the caustic wash solution heated to 85° C. for 15 minutes, then removed, rinsed with water to remove residual caustic wash solution, and measured along each length and width. The data, including calculated area, is collected and shown in Table 5.

TABLE 5

| Sample | Initial Dimensions (inches) | Post-Wash Dimensions (inches) | Initial Area (inches$^2$) | Post Wash Area (inches$^2$) | Percentage Change in Area |
|---|---|---|---|---|---|
| PET 1 | 2.0000 × 2.0000 | 1.31250 × 1.81250 | 4.0000 | 2.3773 | 40.57% |
| PET 2 | 2.0000 × 2.0000 | 1.31250 × 1.75000 | 4.0000 | 2.2969 | 42.58% |
| PET 3 | 2.0000 × 2.0000 | 1.31250 × 1.71875 | 4.0000 | 2.2558 | 43.61% |
| PET Avg. | — | — | 4.0000 | 2.3100 | 42.25% |
| PS 1 | 2.0000 × 2.0000 | 2.00000 × 2.00000 | 4.0000 | 4.0000 | 0.00% |
| PS 2 | 2.0000 × 2.0000 | 2.00000 × 1.96875 | 4.0000 | 3.9375 | 1.56% |
| PS 3 | 2.0000 × 2.0000 | 2.00000 × 1.96875 | 4.0000 | 3.9375 | 1.56% |
| PS Avg. | — | — | 4.0000 | 3.9583 | 1.04% |

Figure 4:
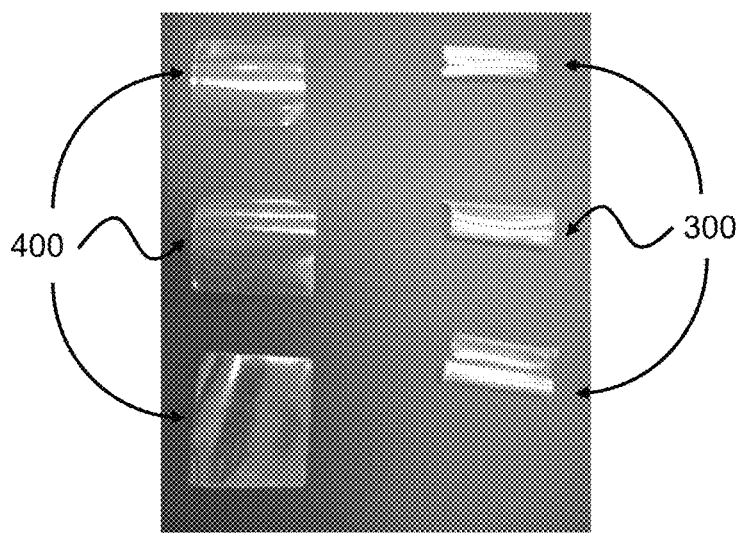
FIG. 4 shows exemplary substrates after treatment in a caustic solution as set forth in the disclosure.

As shown in Table 5, the PET and PS substrates exhibited different shrink values, or percentage change in area, when exposed to caustic wash at 85° C. for 15 minutes. This is further evidenced in FIG. 4, which shows the post-wash PET samples 300 and the post-wash PS samples 400. Given the relative difference in shrinkage and corresponding curling, substrates exhibiting a greater shrinkage and curling after caustic wash exposure experience greater surface area exposure between the adhesive and substrate interface during the recycling process.

During the testing which resulted in the data captured in Table 5, OakTon Stable Temp with caustic solution at 85° C.; DEK-TRON Scientific Instruments DCS-205CTB Constant Temperature Bath Shrink Tension device; Fischer Instruments IsoTemp 210 with caustic solution; MTS 500/S Instron Device; PET Panels (part STND 198418) from Sabic Polymer Shapes; PET Thermoforms from ParPack (shipped from NAPCOR) compliant with APR protocol were employed. The following products were examined: (a) polyethylene (PE) 85 with AE-3413CC (also S2001) adhesive; (b) polyethylene (PE) 85 with AE-3449 (also S490) adhesive; (c) polyethylene (PE) with S100R adhesive; (d) white Biaxially Oriented Polypropylene (BOPP) with S100R adhesive; (e) white Biaxially Oriented Polypropylene (BOPP) with AE-3449 (also S490) adhesive; (f) clear Biaxially Oriented Polypropylene (BOPP) with AE-3413CC (also S2001) adhesive; (g) clear Biaxially Oriented Polypropylene (BOPP) with S100R adhesive; (h) GCX NTC* B Clear Film; (i) GCX NTC*B White Film; (j) GCX NPS* B Clear Film; and (k) GCX NPS* B White Film.

The caustic solution used in these examples was a 3 gallon solution of 0.1 percent NaOH that is formed from mixing 125 grams NaOH pellets with 12,376 grams of water in 5 gallon pail by adding the water in twelve 1000 gram increments and then adding the last 376 grams of water. A surfactant was then added at a concentration 0.3 percent by volume by adding 35.27 mL of TRITON X-100 to 100 grams of water and then the resulting mixture to the 0.1 percent solution of NaOH was added to the 5 gallon pail. The resulting mixture was then gently stirred with a steel rod (mixing blade) to ensure that the Triton-X 100 was thoroughly dispersed in the solution.

Next, 2×4 inch labels were coated and die cut on the pilot coater and Mark Andy press respectively. The labels were hand applied to the substrate and rolled with a 4 pound roller. Clamps were placed onto each 2×6 inch panels (5 reps) then placed onto a SS rod for support. The rod was then placed over the opening of a bath of the caustic solution detailed above at 85° C. for a 6 minute dwell time. Observations were made at the end of the 6 minutes, and samples (if not fully removed from the substrate) were taken to a Instron tester and a 180 peel adhesion is performed to obtain the force of the adhesive to remove it from the substrate. The force necessary to peel the various labels from their substrates are detailed in Table 5.

Samples of the film were then evaluated using a DEK TRON DCS-205CTB device to measure the shrink tension (in MD and CD) of the film. The resultant forces of the adhesive were then compared to that of the film. In one embodiment, the shrinkage value of the face layer or face stock is less than 5%.

Samples of the PE 85/S490, PE 85/S2001, PE 85/S100R, Clear BOPP/S100R, GCX NPS* B/S100R, Clear BOPP/S2001, and White BOPP/S490 were placed on PET thermoforms and immersed in the caustic solution at 85° C. After 4 minutes most samples were floating in the caustic solution after having detached from the substrate. The PE 85 film from Nordenia (located in Jackson, Miss.) and is an unoriented blown PE film. As noted above, the PE 85 film is not an oriented film orientation in at least one direction and yet still yields facestock constructs in accordance with the present invention that overcome the adhesive retention force. This is a significant and unexpected result given the belief in the art that film oriented in at least one direction aided in the release characteristics of facestock. It is noted after this first test that the samples of PET thermoform have curled and shrunken (see FIG. 4).

To evaluate the effect of substrate (e.g. PET thermoform) curling and shrinking, which was the mechanism of removal, ⅛ inch PET panels were evaluated according to the method described supra. When the PET panes were used, many of the film and adhesive combinations tested previously did not remove after immersion for 6 minutes at 85° C. in a caustic bath. While the PET panels bend slightly after immersion for 6 minutes in the 85° C. caustic bath, such panels did not exhibit the same shrink and curl as did the PET thermoforms tested previously. In the case where the facestock did remove from the PET panels, the adhesive (S100R (SR300)) contained a rosin based surfactant component with an unique cloud point such that it was a waxy solid at room temp but liquefied at 110° F. When the label was immersed in warm water the rosin soap liquefied and deadened the label at the adhesive/bottle interface.

The samples were then taken to perform a 180° peel adhesion and separate samples of the film are taken to obtain the shrink force and shrink tension of the films.

TABLE 6

| Material | Material Description | Peel Force (lbs) | Shrink Force (lbs) |
|---|---|---|---|
| Adhesive | 180 Peel S490 adhesive (White BOPP) | 2.91 | — |
| Adhesive | 180 Peel S2001 Adhesive (PE 85) | 1.53 | — |
| Film | GCX NPS* B White | — | 0.340 |
| Film | Clear BOPP MD | — | 0.117 |
| Film | GCX NTC* B Clear | — | 0.103 |
| Film | White BOPP with S490 | — | 0.073 |
| Film | Clear PE 85 with S2001 | — | 0.050 |
| Film | Clear PE 85 with S490 | — | 0.028 |
| Substrate | PET Bottle CD | — | 2.438 |
| Substrate | PET Thermoform CD | — | 1.934 |
| Substrate | PET Thermoform MD | — | 0.859 |
| Substrate | PET Bottle MD | — | 0.217 |

As shown in Table 6, the shrink force of the films is lower than the adhesive peel force. Despite prior conjecture with the art, the film shrink force is not sufficient to overcome the adhesive retention force and accordingly is not the force driving the release of the label/facestock from the labeled article. While not wishing to be bound to any one theory, it is believed that the shrink force of the substrates in combination with the shrink force of the labels/facestocks facilitate the dissolution of the adhesive from the substrate at the interface between the two components.

In the case of adhesive S490 at 2.91 pounds of force, the force of the PET Bottle in the machine direction (MD)+PET Bottle in the cross (or transverse) direction (CD)+Film is required (0.217+1.934+0.073=0.2224). However, as can be seen, the PET bottle force was approximately 77 percent of the force required to overcome the adhesive and creating an avenue for the caustic solution to access the adhesive at the interface between the labeled article and the adhesive. Thus, The results of the films with the adhesives being placed on PET Thermoforms and removed within 6 minutes at 85° C. in a caustic bath demonstrate that, when using a blown PE 85 film that is unoriented, that film orientation in at least one direction is not as impactful on the effectiveness of label removal as previously believed and is unexpected within the art.

Another consideration in the recycling process is that the inks themselves should be compatible for recycling. While UV curable inks in combination with a polymer overlaminate or the correct UV varnish have fared well in recycling processes, water based inks have not fared well in the recycling process because such inks result in staining of the PET bottle and causing a color shift. Given the relatively similar nature of UV curable inks and solvent inks, it is envisioned that solvent inks may work for this recycling method as well as UV screen inks.

While in accordance with the patent statutes the best mode and certain embodiments of the invention have been set forth, the scope of the invention is not limited thereto, but rather by the scope of the attached. As such, other variants within the spirit and scope of this invention are possible and will present themselves to those skilled in the art.

What is claimed is:

1. A labeled article comprising a facestock/adhesive construction, the labeled article comprising:
    an article
    a face layer, wherein the face layer is formed from a facestock material selected from olefin polymers, polystyrene, polyethylene terephthalate (PET), recycled polyethylene terephthalate (rPET) facestocks, polylactic acid, and combinations thereof; and
    an adhesive layer in contact with the face layer, the adhesive having a peel force and a pH which enables the adhesive layer to dissolve, dissociate, or release from the article when washed with a caustic material, wherein the adhesive layer remains in contact with the face layer when washed with the caustic material;
    wherein the face layer is an unoriented film;
    wherein the shrink force of the face layer is from 0.028 to 0.340 lbs., and wherein the shrink force of the face layer is lower than an adhesive peel force; and
    wherein the facestock/adhesive construction is able to be removed from the article in a manner that enables recycling of the article.

2. The labeled article of claim 1, wherein the adhesive layer contains one or more surfactants.

3. The labeled article of claim 2, wherein the one or more surfactants are selected from the group consisting of alkyl phenol ethoxylates, nonyl phenol ethoxylates, salts of ethenesulfonic acid, fatty alcohol ether sulfates, sulfosuccinates, and combinations thereof.

4. The labeled article of claim 2, wherein the one or more surfactants are provided at a concentration of between 4 weight percent and 7 weight percent based on 100 parts of adhesive composition.

5. The labeled article of claim 1, wherein the face layer and the article have a characteristic shrink force and the adhesive has a characteristic peel force and the sum of the shrink forces of the face layer and the article are at least 75% of the peel force of the adhesive.

6. The labeled article of claim 1, wherein the face layer has a first shrinkage value, the article has a second shrinkage value, and the first shrinkage value is less than the second shrinkage value.

7. The labeled article of claim 1, wherein the face layer has a shrinkage value less than 5%.

8. A labeled plastic article comprising:
    at least one plastic article formed from one or more of PET, rPET, a polyester polymer, a recycled polyester polymer, or any combination of two or more thereof, wherein the at least one plastic article contains thereon, or therein, at least one label formed from a facestock/adhesive construction, the label including:
    a face layer, wherein the face layer is formed from a facestock material selected from olefin polymers, polystyrene, PET, rPET facestocks, polylactic acid, and combinations thereof; and
    an adhesive layer in contact with the face layer and the at least one plastic article, the adhesive layer dissolves, dissociates, or releases from the at least one plastic article when washed with a caustic material but remains in contact with the face layer,
    wherein the face layer is an unoriented film;
    wherein the shrink force of the face layer is from 0.028 to 0.340 lbs., and wherein the shrink force of the face layer is lower than an adhesive peel force; and
    wherein the label, or the facestock/adhesive construction, is able to be removed from the plastic article in a manner that enables recycling of the plastic article.

9. The article of claim 8, wherein the adhesive layer contains one or more surfactants.

10. The article of claim 9, wherein the one or more surfactants are selected from the group consisting of alkyl phenol ethoxylates, nonyl phenol ethoxylates, salts of ethenesulfonic acid, fatty alcohol ether sulfates, sulfosuccinates, and combinations thereof.

11. The article of claim 9, wherein the one or more surfactants are provided at a concentration of between 4 weight percent and 7 weight percent based on 100 parts of adhesive composition.

12. A method of removing a facestock/adhesive construction from one or more articles to be recycled, the method comprising the steps of:
(a) supplying at least one article to be later recycled, the article having attached thereto at least one facestock/adhesive construction including
a face layer having a shrink force, wherein the face layer is formed from a facestock material selected from olefin polymers, polystyrene, PET, rPET, polylactic acid, biopolymers, cellulose, and combinations thereof; and
an adhesive layer in contact with the face layer, the adhesive having a peel force and a pH which enables the adhesive layer to dissolve, dissociate, or release from the article when washed with a caustic material, wherein the adhesive layer remains in contact with the face layer when washed with the caustic material,
wherein the facestock is able to be removed from a plastic or metal article in a manner that enables recycling of the plastic or metal article; and
(b) subjecting the article containing the at least one facestock/adhesive construction to at least one caustic solution until the facestock/adhesive construction releases from the article to be recycled;
wherein the face layer is an unoriented film;
wherein the shrink force of the face layer is from 0.028 to 0.340 lbs., and wherein the shrink force of the face layer is lower than the adhesive peel force.

13. The method of claim 12, wherein the temperature of the caustic solution is between 75° C. and 95° C.

14. The method of claim 12, wherein the concentration of caustic material in the caustic solution is 10% or less.

15. The method of claim 12, wherein the caustic solution is agitated at a speed of 1500 rpm or less.

16. The method of claim 12, wherein the article containing the at least one facestock/adhesive construction is subjected to the caustic solution for 15 minutes or less.

17. The method of claim 12, wherein the method further comprises the steps of:
(c) separating the removed one or more facestock/adhesive construction from the article to be recycled; and
(d) optionally washing the article to be recycled to remove any remaining caustic solution prior to further recycling steps.

18. The method of claim 12, wherein the article to be recycled is formed from PET, rPET, a polyester polymer, a recycled polyester, polylactic acid, biopolymers, cellulose and combinations thereof.

19. The method of claim 12, wherein the olefin polymer facestock is one of polyethylene facestocks and polypropylene facestocks.

20. The method of claim 12, wherein the face layer is formed from a facestock having two or more layers in the facestock material.

21. The method of claim 12, wherein the adhesive is a tacky, emulsion pressure-sensitive adhesive polymer.

22. The method of claim 12, wherein the adhesive is an acrylic emulsion polymer system comprising a copolymer of about 15 weight percent to about 35 weight percent of vinyl acetate, about 20 weight percent to about 40 weight percent of di-2-ethylhexyl maleate, about 35 weight percent to about 60 weight percent 2-ethylhexyl acrylate and about 1 weight percent to about 3 weight percent of one or more unsaturated carboxylic acids for each 100 parts by weight of polymer, and about 3 weight percent to about 20 weight percent of acidic rosin derivative provided as tackifier and about 1 weight percent to about 10 weight percent of a rosin based surfactant based on 100 parts of the adhesive composition.

23. The method of claim 12, wherein the at least one caustic solution is selected from NaOH, KOH, LiOH, MgOH, CaOH, or suitable mixtures of two or more thereof.

24. The method of claim 12, wherein the at least one caustic solution further comprises at least one surfactant.

25. The method of claim 12, wherein the at least one caustic solution further comprises at least one nonionic surfactant.

26. The method of claim 12, wherein each of the caustic solution, the face layer, and the article have a different density.

27. The method of claim 12, wherein the density of the face layer is less than the density of the caustic solution.

28. The method of claim 12, wherein the density of the face layer is greater than the density of the caustic solution.

29. The method of claim 12, wherein the face layer has a first shrinkage value in response to the caustic wash, the article has a second shrinkage value in response to the caustic wash, and the first shrinkage value is less than the second shrinkage value.

30. The method of claim 12, wherein the face layer has a shrinkage value less than 5%.

31. The method of claim 12, wherein the face layer and the article have a characteristic shrink force, the adhesive has a characteristic peel force, and the sum of the shrink forces of the face layer and the article are at least 75% of the peel force of the adhesive.

* * * * *